March 19, 1946.　　J. C. THOMAS, 3RD　　2,396,760
COLLET CLOSER
Filed July 22, 1943　　2 Sheets-Sheet 1

INVENTOR.
James C. Thomas III
BY F. Bascom Smith
ATTORNEY

March 19, 1946. J. C. THOMAS, 3RD 2,396,760
COLLET CLOSER
Filed July 22, 1943 2 Sheets-Sheet 2
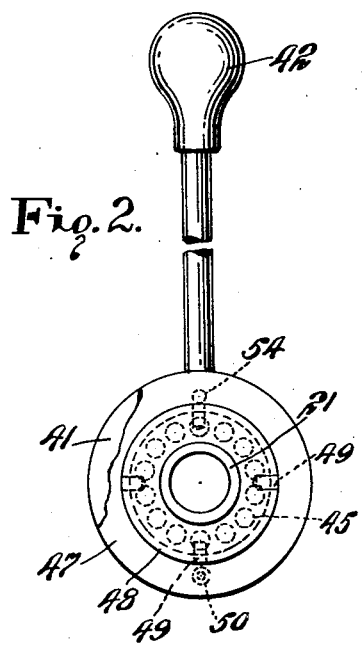
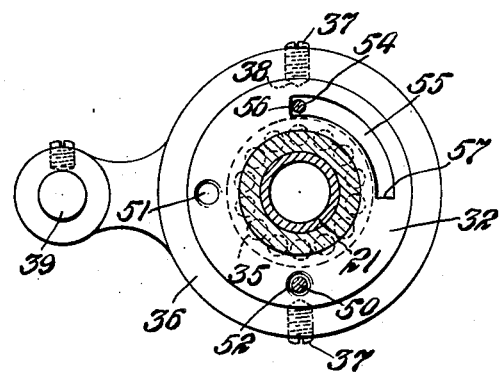
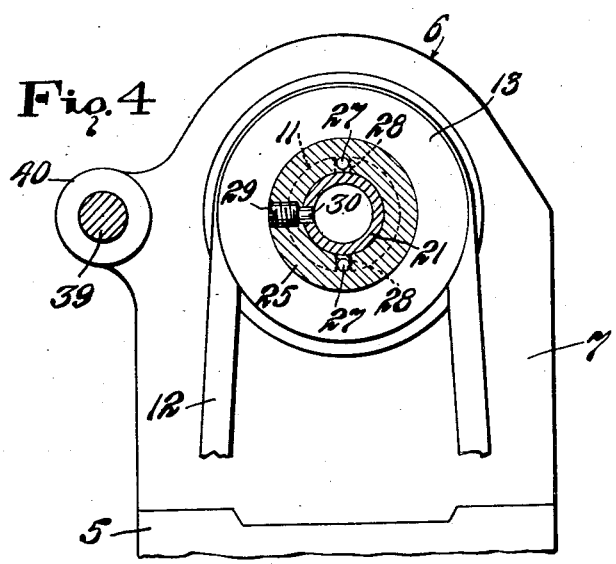
INVENTOR.
BY James C. Thomas III
F. Bascom Smith
ATTORNEY Patented Mar. 19, 1946

2,396,760

UNITED STATES PATENT OFFICE 2,396,760

COLLET CLOSER

James C. Thomas, III, Glendale, Calif., assignor to Globe Products Manufacturing Company, Los Angeles, Calif., a corporation of California Application July 22, 1943, Serial No. 495,760

3 Claims. (Cl. 279—52)

This invention relates to machine tool headstock structures and more particularly to mechanism associated therewith for operating a collet-type chuck to grip the material to be operated upon.

One object of the present invention is to provide an improved and simplified mechanism for operating collet-type chucks for machine tools.

Another object of the invention is to provide an improved mechanism for operating collet-type chucks which, through novel construction and arrangement of component parts thereof, reduces the drag of said mechanism to a minimum on the machine tool driving means.

Another object is to provide an improved mechanism for operating collet-type chucks which is extremely quiet in operation and has relatively few members subject to wear.

These and other objects of the present invention will appear as the following description thereof proceeds, and in order to more clearly understand said invention reference may be had to the accompanying drawings which illustrate one embodiment thereof.

In said drawings:

Fig. 2 is an end view looking from the left of Fig. 1, with parts omitted for purposes of clearer illustration;

Fig. 3 is a vertical sectional view on the line 3—3 of Fig. 1; and

Fig. 4 is a vertical sectional view on the line 4—4 of Fig. 1.

Figure 1:
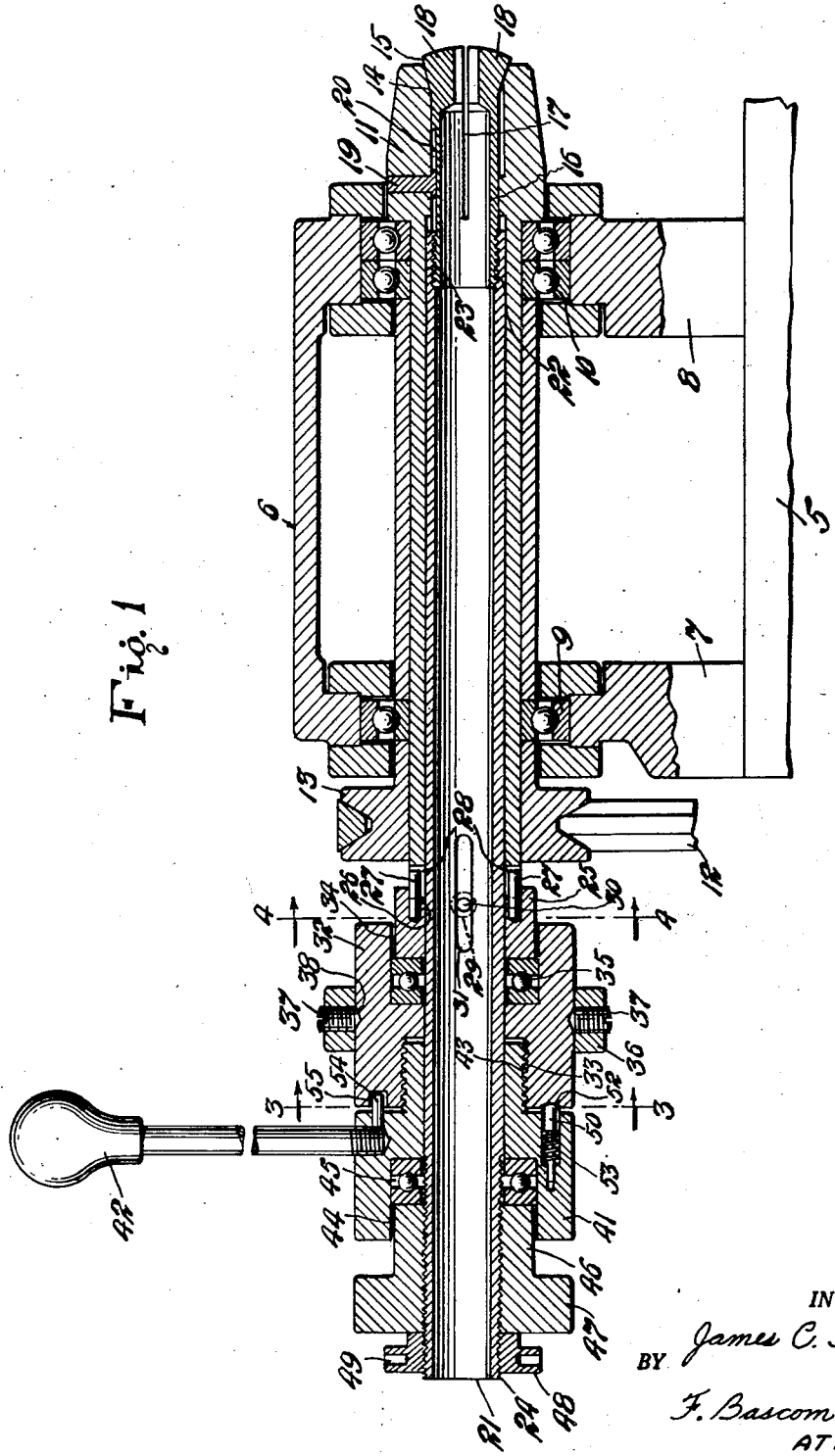
Fig. 1 is a vertical longitudinal sectional view of a lathe head-stock embodying the present invention.

Referring to the drawings, and wherein like reference characters designate like parts throughout the several views, 5 indicates a bed of a lathe of usual construction which supports a headstock indicated broadly at 6 having longitudinally spaced bearers 7 and 8 (Fig. 1). The bearers 7 and 8 are provided with a single row ball bearing 9 and a double row ball bearing 10, respectively, in which is journalled a longitudinally extending hollow, head-stock spindle 11. The head stock spindle 11 is driven from any suitable source of power and by any suitable means as, for example, by a V belt 12 which passes around and drives a pulley 13 that is keyed or otherwise suitably secured to said head-stock spindle on the end thereof projecting outwardly from the bearer 7.

The hollow, head-stock spindle 11 is formed on the extreme end thereof projecting outwardly from the bearer 8 with an internal taper 14 (Fig. 1) to receive a corresponding external taper 15 that is formed on a hollow, collet-type chuck 16 which is provided with longitudinal slots 17 forming resilient, material gripping jaws 18. It will thus appear that due to the tapers 14 and 15 on the spindle 11 and chuck 16, respectively, the jaws 18 of said chuck, upon the latter being drawn into the hollow, head-stock spindle 11, that is, toward the left as viewed in Fig. 1, will contract and thus positively grip and hold the material to be operated upon, as well understood in the art. The chuck 16 is connected with the head-stock spindle 11 for rotation therewith, and held against rotation relatively to said spindle, by a key 19 which is secured in the head-stock spindle 11 and engages in a keyway 20 that is formed in the chuck 16 and of sufficient length to enable axial movement of said chuck for purposes hereinbefore described.

In accordance with the present invention, improved and simplified mechanism is provided to operate the chuck 16 to grip and release the material operated upon, which mechanism, through novel construction and arrangement of component parts thereof, reduces the drag on the head-stock spindle driving means to a minimum; has relatively few parts subject to wear; and is extremely quiet in operation. As herein shown, said mechanism is preferably mounted, constructed and operated as follows.

Fitted for axial movement in the hollow, head-stock spindle 11 and extending outwardly beyond the latter and the driving pulley 13 is a hollow, chuck-spindle 21 (Fig. 1) provided at one end thereof with internal right hand threads 22 which receive the threaded end 23 of the chuck 16. The opposite end of the hollow, chuck-spindle 21 is provided with external right hand threads 24 for purposes hereinafter described. The chuck-spindle 21 is rotated with the head-stock spindle 11, and for this purpose said chuck-spindle has loosely mounted thereon a collar 25 which is slightly counterbored as indicated at 26 to receive the adjacent end of the head-stock spindle 11. Secured in any suitable manner in the collar 25 are two pins 27 (Figs. 1 and 4) which are disposed diametrically opposite each other and project into slotted openings 28 formed in the adjacent end of the head-stock spindle 11. Threaded in a suitable opening in the collar 25 is a set screw 29 having a reduced end 30 which engages in a slotted opening 31 formed in the chuck-spindle 21 and of sufficient length to permit axial movement of said chuck spindle to open and close the chuck 16. It will thus appear that the chuck-spindle 21 is rotated in unison with and by the head-stock spindle 11 through the described driving connections therefor, and capable of axial movement relatively to said head-stock spindle through the screw and slot connection 29, 30 and 31, without imparting corresponding axial movement to the collar 25. It will further appear that the set screw 29 in addition holds the chuck-spindle 21 against rotation relatively to the head-stock spindle 11.

Loosely mounted on the chuck spindle 21 and adjacent the collar 25 is a cylindrical body 32 (Fig. 1) provided at one end thereof with internal left-hand threads 33, and at the opposite end with a suitable counterbore 34 which receives the collar 25 and a thrust bearing 35. The thrust bearing 35 is located between the collar 25 and the body 32, and is of well known construction needing no detail description herein, except to say that the purpose thereof is to reduce to a minimum the drag or frictional contact of the rotating collar 25 on the body 32 which, as hereinafter described, is held stationary and has no movement imparted thereto.

Surrounding the body 32 is one end of a strap 36 (Figs. 1 and 3) provided with oppositely disposed set screws 37 which engage in suitable depressions 38 formed in said body to hold the latter against rotation. The opposite end of the strap 36 is engaged over and suitably secured to a rod 39 (Figs. 3 and 4) which, in turn, is threaded or otherwise suitably secured in an extension 40 that is secured to or formed integrally with the head-stock 6. It will thus appear that the body 32 is held against rotary and endwise movements by the strap 36.

Loosely mounted on the chuck-spindle 21 for partial rotation in opposite directions relatively thereto, is a second body 41 (Fig. 1) having threaded therein a handle 42 for effecting rotation thereof. This body 41 is provided at one end thereof with external left-hand threads 43 having threaded engagement with the threads 33 in the body 32. The opposite end of the body 41 is formed with a suitable counterbore 44 to receive a thrust bearing 45 and the reduced end 46 of a knurled hand-wheel 47 which is threaded on the threaded end 24 of the chuck-spindle 21. The thrust bearing 45 is located between the body 41 and the handwheel 47, and is of well known construction needing no detail description herein, except to say that the main purpose thereof is to enable rotation of the head-stock spindle 11, the chuck-spindle 21, and the chuck 16, without corresponding rotation of the body 41, during the time clamping pressure is applied to the chuck to grip the material to be operated upon.

The hand-wheel 47 is employed to effect preliminary engagement of the chuck with the material, and it will therefore appear that since the chuck-spindle 21 is held against rotation relatively to the head-stock spindle 11 by the set screw 29, rotation of said hand-wheel in a clockwise direction as viewed in Fig. 2 causes the chuck-spindle 21 and the chuck 16 to move toward the left as viewed in Fig. 1 until the jaws 18 of said chuck engage the material to be operated upon. The hand-wheel 47 may be locked in adjusted positions by any suitable means as, for example, by a lock nut 48 having threaded engagement with the threads 24 on the chuck-spindle 21 and provided with a plurality of radially disposed openings 49 to receive a pin-wrench or the like.

The chuck 16 having been preliminarily adjusted by the hand-wheel 47 as previously described, pressure is now applied to said chuck to firmly grip and hold the material, by rotating the body 41 by the handle 42 clockwise as viewed in Fig. 2 through an angle of 90 degrees from the normal position thereof shown in said figure. Since the body 32 is held stationary by the strap 36 as hereinbefore described, the body 41 through clockwise rotation thereof, is caused to move axially toward the left as viewed in Fig. 1, thus imparting a corresponding movement to the chuck-spindle 21 and the chuck 16 through the thrust bearing 45, and the hand-wheel 47, whereupon the jaws 18 of said chuck grip the material with maximum pressure for operation thereon. When the operations on the material are completed, the body 41 is rotated counter-clockwise as viewed in Fig. 2 back to its normal position, whereupon said body moves axially toward the right as viewed in Fig. 1, thus releasing the pressure of the jaws 18 of the chuck 16 on the material. A new end portion of the material is then moved into position at which time the above described operations are repeated.

The body 41 is held in its normal position shown in Fig. 2, and in its chuck, pressure applying position, by a spring pressed detent pin 50 (Figs. 1 and 3). This detent pin 50 is carried in a suitable opening formed in the body 41, and engages in suitable depressions 51 and 52 formed in the adjacent end of the body 32 and spaced 90 degrees apart. The spring for detent pin 50 is indicated at 53. Excess rotation of the body 41 in opposite directions is prevented by a stop pin 54 (Figs. 1 and 3) which is secured in any suitable manner in said body and projects into an arcuate-shaped groove 55 that is formed in the adjacent end of the body 32 and provides shoulders 56 and 57 spaced 90 degrees apart for engagement by the stop pin 54.

While the present invention is herein illustrated and described in connection with a chuck of the draw-in type, it is equally adaptable for use with a chuck of the push-out type by reversing the thrust or pressure applying action. It is therefore to be expressly understood that the present invention is not limited to the embodiment thereof herein illustrated and described or otherwise than by the terms of the appended claims.

What I claim is:

1. In a mechanism for operating a chuck of the collet-type which is connected with a chuck-spindle arranged within a driven spindle, the combination of a collar loosely mounted on the chuck-spindle and connected with said driven spindle for rotation thereby, means comprising a pin and slot connection for connecting said collar with said chuck-spindle to rotate the latter and to enable axial movement of said chuck-spindle without corresponding axial movement of said collar, an internally threaded member mounted on said chuck-spindle, means holding said internally threaded member against rotation, a thrust bearing interposed between said collar and said internally threaded member, an externally threaded member mounted on said chuck spindle and having threaded engagement with said internally threaded member, a handle for imparting rotation to said externally threaded member in opposite directions to cause said member to move axially in opposite directions, and means for transmitting the axial movement of said externally threaded member in one direction to the chuck-spindle to cause the chuck to firmly grip the material, comprising a hand-wheel having threaded engagement with said chuck-spindle, and a thrust bearing interposed between said externally threaded member and said hand-wheel.

2. The combination with a machine tool head-stock having a driven spindle, and a collet-type chuck connected with a chuck-spindle arranged in said driven spindle, of a collar connected with said driven spindle for rotation thereby, means connecting said collar with said chuck-spindle to rotate the latter and to enable axial movement of said chuck-spindle without corresponding axial movement of said collar, a first member, an arm secured to said first member and connected with said head-stock to hold said member against rotary and axial movements, a thrust bearing interposed between said collar and said first member, a second member having threaded engagement with said first member, and handle for rotating said second member to cause axial movement thereof, and means for transmitting said axial movement of said second member to the chuck-spindle to cause the chuck to firmly grip the material, comprising a hand-wheel having threaded engagement with said chuck-spindle, and a thrust bearing interposed between said second member and said hand-wheel.

3. The combination with a machine tool head-stock having a driven spindle, and a collet-type chuck connected with a chuck-spindle arranged in said driven spindle, of a collar connected with said driven spindle for rotation thereby, means connecting said collar with said chuck-spindle to rotate the latter and to enable axial movement of said chuck-spindle without corresponding axial movement of said collar, an internally threaded member, an arm secured to said internally threaded member and connected with said head-stock to hold said member against rotary and axial movements, a thrust bearing interposed between said collar and said internally threaded member, an externally threaded member having threaded engagement with said internally threaded member, a handle secured to said externally threaded member for imparting rotation thereto to cause axial movement thereof, and means for transmitting said axial movement of said externally threaded member to the chuck-spindle to cause the chuck to firmly grip the material.

JAMES C. THOMAS, III.